United States Patent [19]
Vopat

[11] Patent Number: 5,923,281
[45] Date of Patent: Jul. 13, 1999

[54] TERRAIN BIAS COMPENSATOR FOR DOPPLER NAVIGATION SYSTEMS

[75] Inventor: Raymond W. Vopat, Flushing, N.Y.

[73] Assignee: Lockheed Martin Corporation, Bethesda, Md.

[21] Appl. No.: 08/998,439

[22] Filed: Dec. 26, 1997

[51] Int. Cl.$^6$ .............................. G01S 13/60; G01S 15/60
[52] U.S. Cl. .............................. 342/117; 367/87; 367/904
[58] Field of Search .................................. 367/87, 88, 90, 367/904; 342/117

[56] References Cited

U.S. PATENT DOCUMENTS

| | | | |
|---|---|---|---|
| 3,113,308 | 12/1963 | Stavis | 342/117 |
| 3,134,102 | 5/1964 | Goldfischer | 342/117 |
| 3,139,618 | 6/1964 | Goldfischer et al. | 342/117 |
| 3,192,523 | 6/1965 | Lurie | 342/117 |
| 3,259,898 | 7/1966 | Tober | 342/117 |
| 3,430,236 | 2/1969 | Gamertsfelder | 342/117 |

*Primary Examiner*—Ian J. Lobo
*Attorney, Agent, or Firm*—Seymour Levine

[57] ABSTRACT

A terrain bias compensator for a Doppler navigation system utilizes an auxiliary beam with each beam of the Doppler system to form Doppler beam pairs. The axis of the auxiliary beam is slightly offset from the axis of the main beam and is positioned so that the two axes are in the same vertical plane. After slant range compensation, the amplitudes of the Doppler spectrum of each beam is averaged over a predetermined time interval. The difference between the mean amplitudes of the two beams is divided by the offset angle to establish an amplitude per degree correction factor which is applied to the main beam signal returns to establish a main beam amplitude corrected Doppler spectrum.

4 Claims, 5 Drawing Sheets

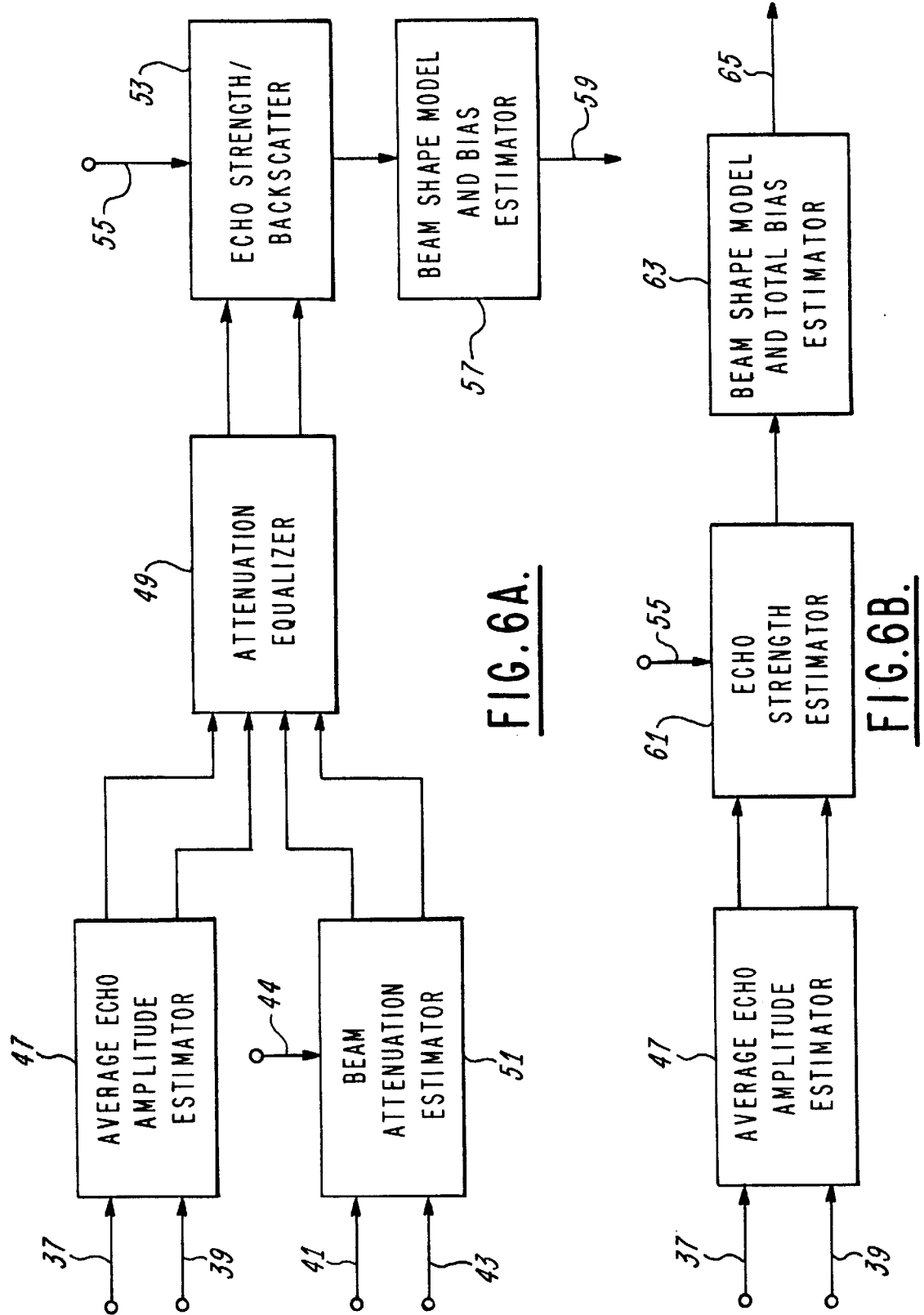

TERRAIN BIAS COMPENSATOR FOR DOPPLER NAVIGATION SYSTEMS

BACKGROUND OF THE INVENTION

1. Field of the Invention

The invention pertains to the field of Doppler navigation systems and more particularly to the compensation for terrain bias errors in the Doppler frequency spectrum of such systems.

2. Description of the Prior Art

A Doppler navigation system, on a moving vehicle, employs a device to transmit signals, such as electromagnetic signals or acoustic signals, towards a surface (terrain). These signals are scattered from the terrain, with portions of the scattered signals being retrodirected (backscattered). Due to the motion of the vehicle, the frequency of the backscattered signals received at the vehicle undergo a Doppler frequency shift. The navigation system detects and utilizes this Doppler frequency to determine the velocity components of the vehicle. The Doppler frequency is related to the velocity of the vehicle by the basic equation $f_D=(2V \cos \phi)/\lambda$, where $f_D$ is the Doppler frequency shift, $V$ is the vehicle's velocity, $\phi$ is the angle between the velocity vector and the direction of signal propagation, and $\lambda$ is the wavelength of the transmitted signal.

Since the signal beam has a finite width, as shown in FIG. 1, and the signal return from the terrain is backscattered in a random like manner, the Doppler frequency within the beam is not a single frequency, but is a noiselike frequency spectrum, such as the spectrum 11 shown in FIG. 2. The centroid of the frequency band between the 3 dB points of the spectrum is generally utilized in the above given equation to determine the velocity. The frequency bandwidth is dependent on the system beamwidth and may be expressed mathematically by $\Delta f_D=[(2V/\lambda) \sin \phi] \Delta\phi$, where $\Delta f_D$ is the half power spectrum bandwidth, and $\Delta\phi$ is the two-way system beamwidth.

If the scattering terrain were shaped in a manner to be equal distant from the transmitting device for all rays within the 3 dB beamwidth, as shown by the arc 13 in FIG. 1, the centroid frequency $f_d=(2V \cos \phi_0)/\lambda$ of the spectrum 11 would be the Doppler shift of the central ray 15 in two way system pattern, where $\phi_0$ is the angle from the velocity vector of the central ray 15. Slant ranges within the 3 dB points of the two way system pattern, however, vary from $r_1=h/\sin (\phi_0-\Delta\phi/2)$ to $r_2=h/\sin (\phi_0+\Delta\phi/2)$, for typically flat horizontal terrain, and the amplitudes of the Doppler frequency signals vary in an inverse relationship to the slant range. With these variations the Doppler frequency spectrum will be skewed. This skewing causes the centroid of the Doppler spectrum to be shifted by $\Delta f_d$, as shown by the spectrum 12 in FIG. 2, from the frequency $f_d$ at the central ray $\theta_0$ of the two way system beamwidth. Since h, $\phi_0$, and $\Delta\phi$ are known, compensation for errors due to the range variations over the beamwidth may be made, provided that, within the two way beamwidth, the backscatter coefficient over the illuminated terrain is relatively constant and not a function of the incident ray angle.

The amplitude $M(\phi)$ of the Doppler signal at each angle within the beam is generally proportional to $G(\phi)$, $R(\phi)$, and $A(\phi)$; where $G(\phi)$ is the value of the two way beam pattern at the angle $\phi$, $R(\phi)$ is the backscattter coefficient of the terrain at the angle of incidence corresponding to the beam angle $\phi$, and $A(\phi)$ is the slant range attenuation at the beam angle $\phi$. Consequently, the amplitude of the Doppler frequency spectrum will not, in general, be symmetrical, but would be skewed, as shown by the spectrum 12 of FIG. 2. Generally, terrain backscatter coefficient variations within the beamwidth are not known. As a result, compensation for these variations can not be accurately applied. Under normal conditions the variation of the terrain's backscatter coefficient with the incident angle is the primary cause of the residual velocity error of a precision Doppler navigation system.

The above discussion relates to the fundamental method of determining velocity with the measurement of the Doppler frequency shift experienced by backscattered signals received within a Doppler navigation system beamwidth. Since the velocity of a vehicle has three components, a minimum of three beams are required to determine the velocity vector. A Three beam system, comprising beams A1, A2, and A3 is shown in FIG. 3A and a four beam system, comprising beams B1, B2, B3, and B4 is shown in FIG. 3B. The four beam system is generally utilized. The four beam configuration, in addition to providing the velocity vector, minimizes the effects of the vehicle's roll and pitch on the detected Doppler frequency. The beams are symmetrically positioned about the vehicle's vertical axis 19 and the Doppler frequencies $f_{D1}$–$f_{D4}$ at the centers of beams B1–B4, respectively, for this configuration are given by:

$$f_{D1} = \frac{2}{\lambda}(-V_H \cos\alpha \cos\theta + V_D \cos\alpha \sin\theta + V_V \sin\alpha)$$

$$f_{D2} = \frac{2}{\lambda}(V_H \cos\alpha \cos\theta + V_D \cos\alpha \sin\theta + V_V \sin\alpha)$$

$$f_{D3} = \frac{2}{\lambda}(V_H \cos\alpha \cos\theta - V_D \cos\alpha \sin\theta + V_V \sin\alpha)$$

$$f_{D4} = \frac{2}{\lambda}(-V_H \cos\alpha \cos\theta - V_D \cos\alpha \sin\theta + V_V \sin\alpha)$$

where:
  $V_H$ is the heading velocity
  $V_D$ is the drift velocity
  $V_V$ is the vertical velocity
  $\theta$ is the angle between the beam centroid and the vertical plane containing the longitudinal axis of the vehicle
  $\alpha$ is the angle between the beam centroid and the plane parallel to the longitudinal axis of the vehicle.

It should be evident from these equations that the heading velocity $V_H$ may be obtained from the average of the differences $f_{D2}-f_{D1}$ and $f_{D3}-f_{D4}$; $V_D$ may be obtained from the average of the differences $f_{D1}-f_{D4}$ and $f_{D2}-f_{D3}$; and $V_V$ may be obtained from the average $f_{D1}+f_{D3}$ and $f_{D2}+f_{D4}$.

Each of the beams B1–B4 is subject to the biases previously discussed. These biases, if not corrected, cause errors in the determination of the three velocity components, which in turn cause errors in the determination of the vehicle position.

SUMMARY OF THE INVENTION

It is an object of the present invention to provide a method and apparatus for correcting velocity errors, in a Doppler navigation system, that are due to the skew in the Doppler frequency spectrum caused by variations in the backscatter strength as a function of incident angle.

In accordance with the present invention an auxiliary beam is added to each main beam in a Doppler navigation system, thereby forming beam pairs. The axis of the auxiliary beam in each pair is slightly offset from the axis of the main beam and is positioned such that the two axes are in the same vehicle oriented vertical plane. Slant range amplitude compensation is applied to each beam and the amplitudes of the Doppler frequency spectrum of each beam are averaged over a predetermined time interval. The difference of the mean amplitudes of the two averaged spectrums is an estimate of the terrain bias. This difference is divided by the offset angle to provide an amplitude (terrain bias) per degree correction factor. This correction factor is applied to the amplitudes of the main beam Doppler frequency spectrum to establish an amplitude corrected spectrum. The frequency at the centroid of this corrected spectrum is the Doppler frequency utilized in the navigation system.

BRIEF DESCRIPTION OF THE DRAWINGS

FIGS. 6A and 6B are block diagrams of beam bias estimators that may be used in the Doppler navigation system of FIG. 5

DESCRIPTION OF THE PREFERRED EMBODIMENTS

Figure 1:
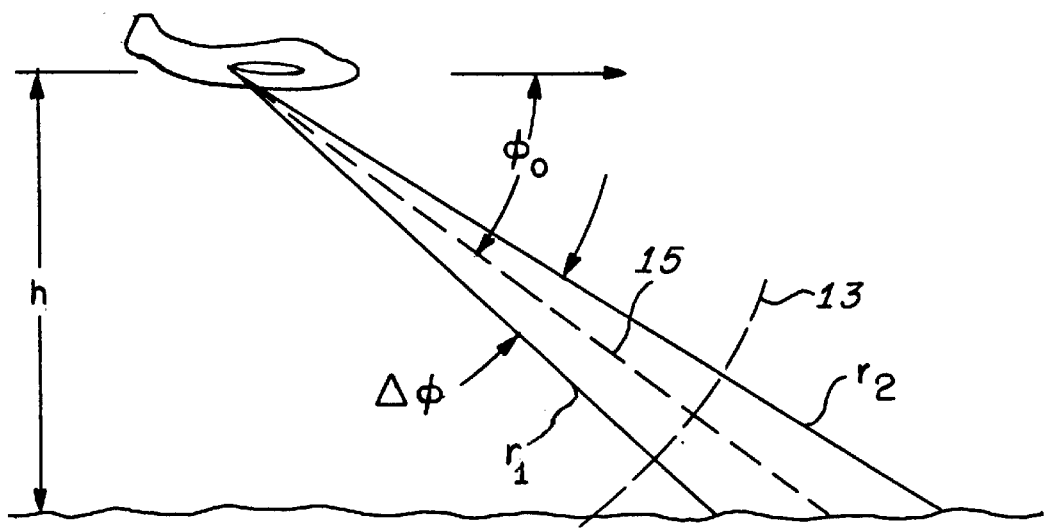
FIG. 1 is a diagram of a typical beam position for a Doppler navigation system.
Figure 2:
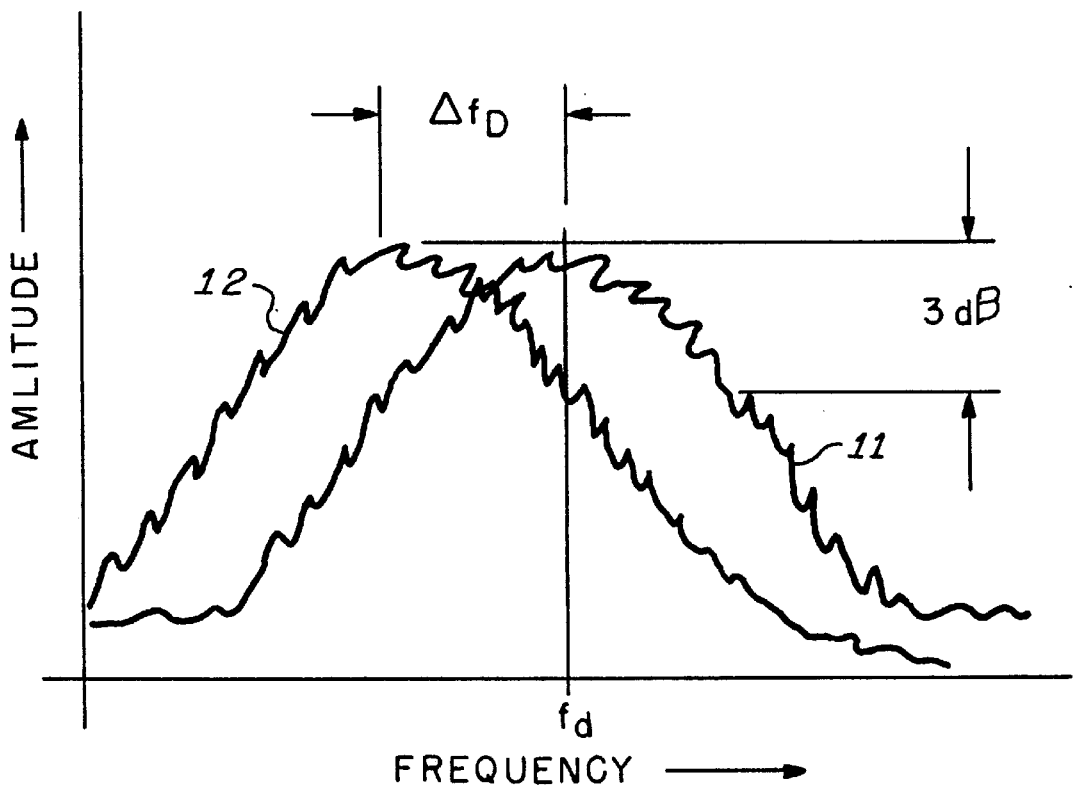
FIG. 2 shows a Doppler frequency spectrum for a reflecting terrain that is equal distant from the vehicle for all rays within the signal beam and a Doppler frequency spectrum for a substantially flat reflecting terrain.
Figure 3A:
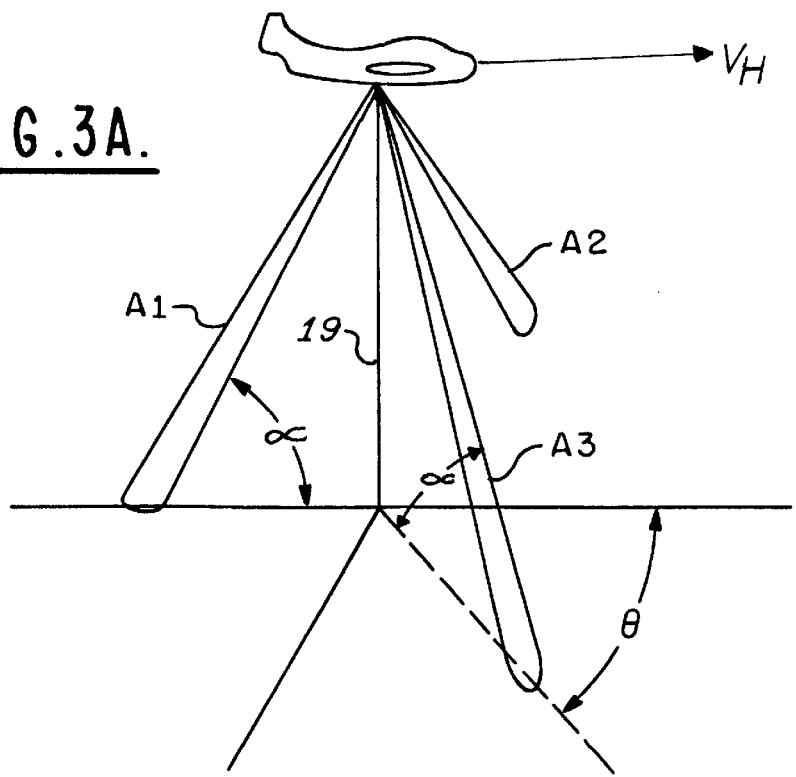
FIG. 3A is a beam diagram of a three beam Doppler navigation system.
Figure 3B:
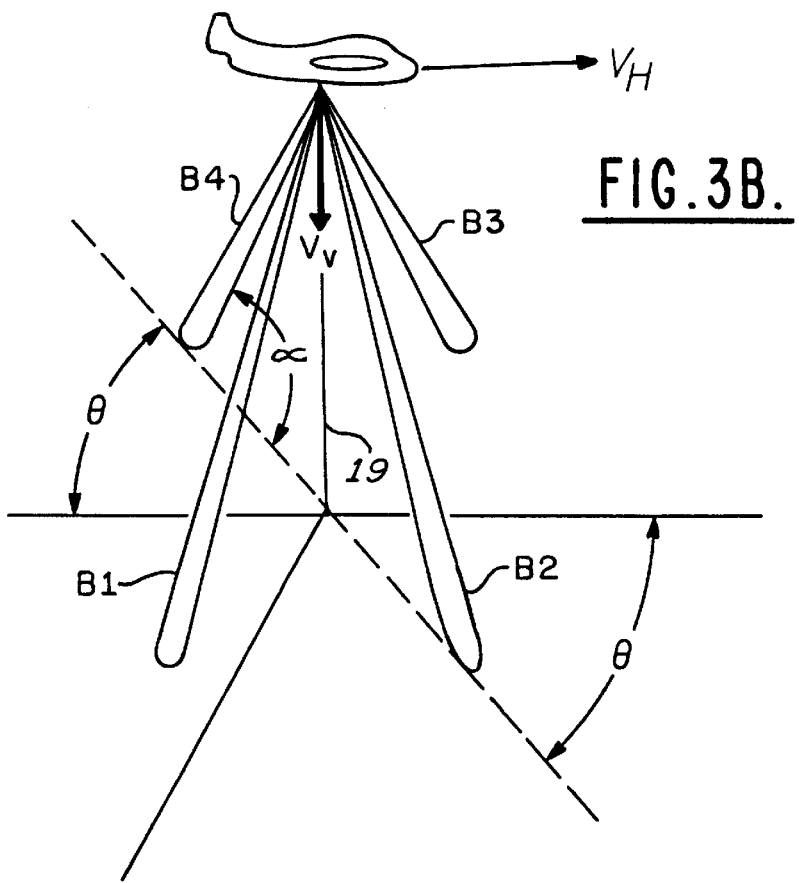
FIG. 3B is a beam diagram of a four beam Doppler navigation system.
Figure 4A:
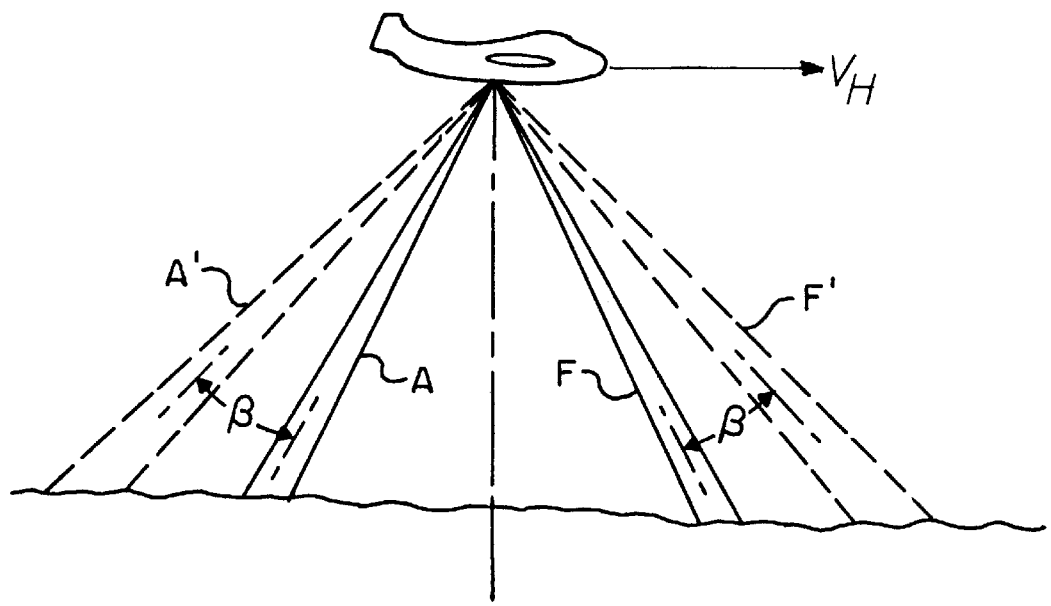
FIGS. 4A and 4B are diagrams showing two representative beams of a multiple beam Doppler navigation system, each beam having an adjacent auxiliary beam.
Figure 4B:
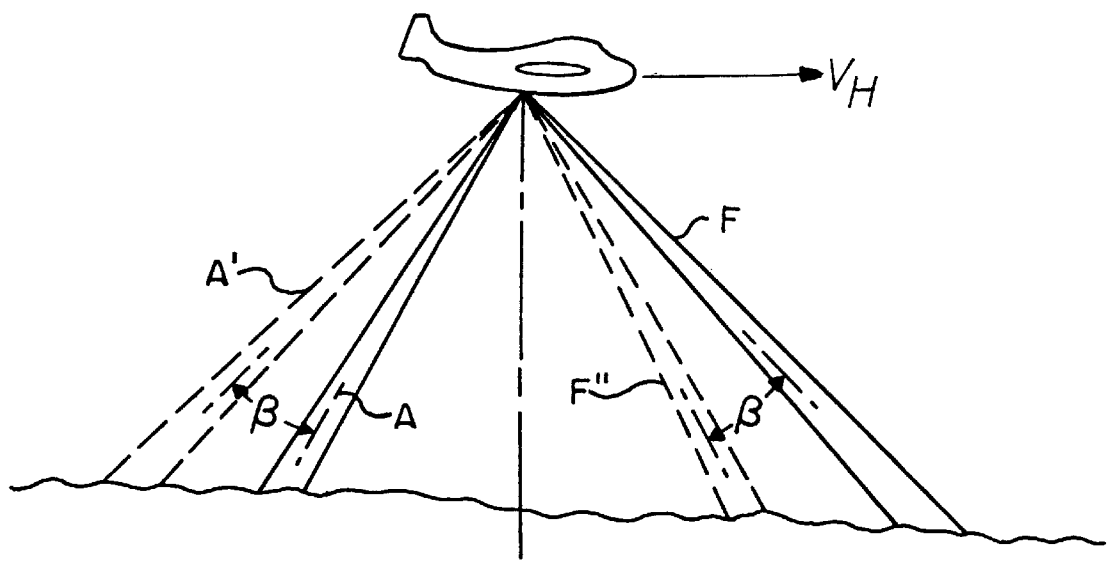

For clarity of presentation and simplicity of explanation, the Doppler navigation system will be considered to have only two main Janus beams and mounted on a vehicle having its longitudinal axis in a horizontal plane with its downward axis aligned with the terrain vertical, as shown in FIGS. 4A and 4B. In these figures and all subsequent figures, elements that are the same have the same reference numerals.

Refer now to FIGS. 4A and 4B. The two main beams A and F are shown with each having an adjacent auxiliary beam A' and F', respectively. In FIG. 4A, main beam F is preceded by an auxiliary beam F', while main beam A is followed by auxiliary beam A'. The auxiliary beams A' and F' are positioned in the same vertical plane as the corresponding main beam and are offset from the main beams A and F by an angle β. Though the offset angles are preferably equal, this is not a requirement. A slight variation of the auxiliary beam arrangement of FIG. 4A is shown in FIG. 4B wherein the auxiliary beam F" follows the main beam F. The auxiliary beam offset angles may be the same for both configurations. Other configurations of main and auxiliary beam pairings may be utilized, as for example, the auxiliary beams may respectively precede main beams A and F or the auxiliary beams may respectively precede main beam A and follow main beam F.

Backscattered signals (echoes) received on the main and auxiliary beams are processed to extract the Doppler frequency spectrum of the signals received on each beam. The mean amplitude of these spectrums are compared, as will be explained subsequently, to establish an estimate of echo strength as a function of beam angle. This estimate is then utilized as a correction factor on the main beam Doppler spectrum to provide compensation for the total beam bias.

Figure 5:
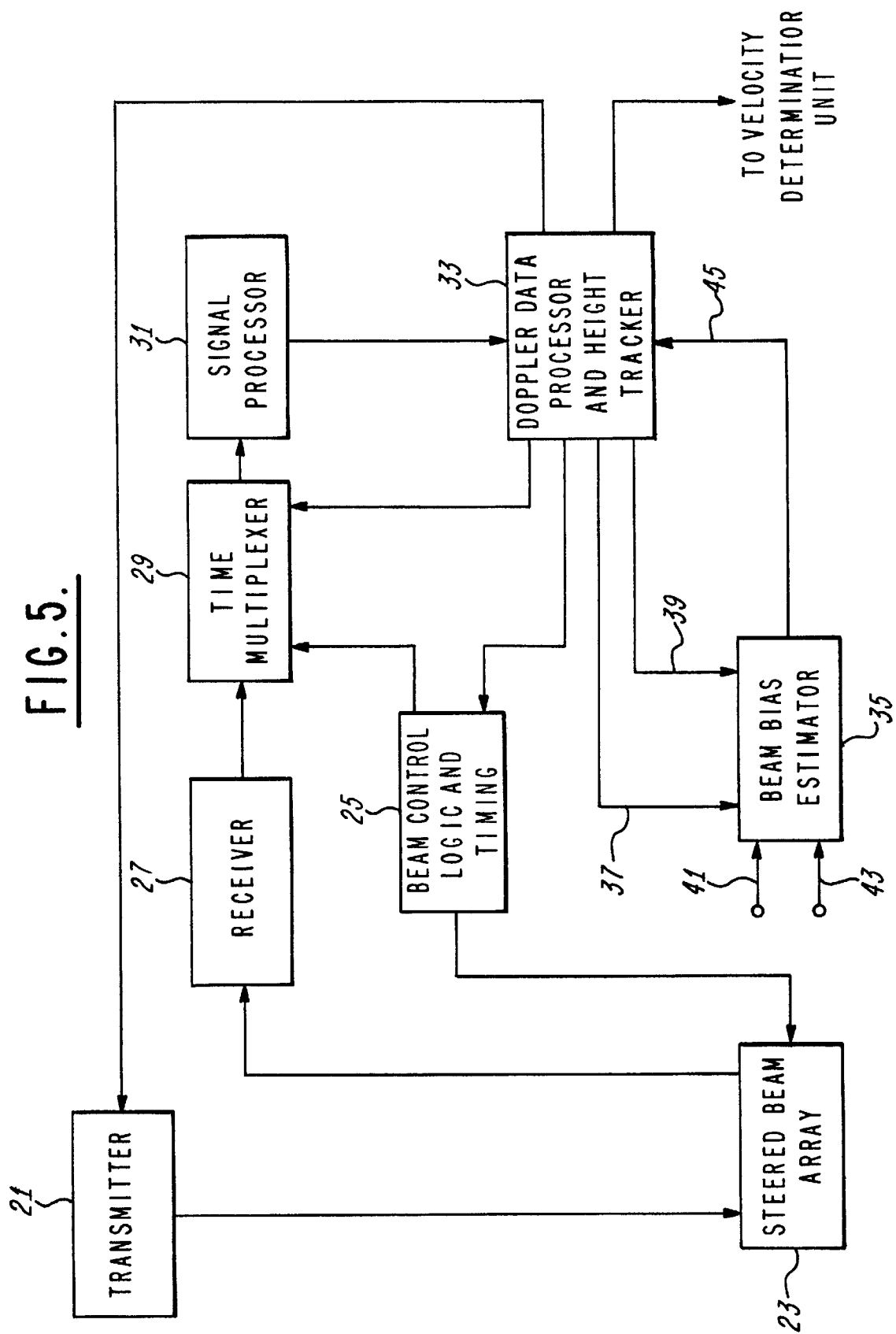
FIG. 5 is a block diagram of a Doppler navigation system having a beam bias estimator.

Refer now to FIG. 5. Signals from a transmitter 21 are coupled to a steered beam array 23 for transmission. Beam positions provided by the steered beam array 23 are controlled by signals from a beam control logic and timing unit 25. In a multiple beam Doppler navigation system this unit is programmed to steer the beams of the steered beam array 23 to the angular positions of the main and auxiliary beams. Though arrays may be designed to radiate multiple beams simultaneously, such arrays are extremely complicated. Generally, the steered beam array and the control logic and timing are designed to provide the Doppler navigator beams on a sequential basis.

Signals incident to the steered array 23, after reflection from the terrain, are coupled to a receiver 27 wherein the signals are band filtered and preamplified. Output signals from the receiver 27 are coupled through a time multiplexer 29 to a signal processor 31. Time multiplexer 29, using previous slant range and transmitter timing information, separates the auxiliary beam signals from the main beam signals and routes each to the signal processor 31. The slant range time interval is in the order of 2S/c, where S is the slant range and c is the signal velocity in the propagating medium. Signal processor 31 processes the output signals coupled from the receiver 27 and provides Doppler data to the Doppler data processor and height tracker 33, wherein the main beam and the auxiliary beam pairs are processed to provide the Doppler spectrums and updated slant ranges of each. Main beam and auxiliary beam Doppler spectrum data established by the Doppler data processor and height tracker 33 are coupled to beam bias estimator 35 via lines 37 and 39 respectively.

Data representative of vehicle attitude (roll, pitch, heading) and data representative of the propagating media characteristics, from which refined values of signal attenuation may be determined, are coupled to the beam bias estimator 35 via lines 41 and 43 respectively. These signals are utilized to establish slant range and total signal attenuation within each beam. Beam bias estimator 35 receives the main and auxiliary beam Doppler data signals from the Doppler data processor 33, applies the necessary attenuation corrections, and determines the mean amplitude of these spectrums. These mean amplitudes are compared to establish an estimate of echo strength as a function of beam angle. Signals representative of the echo strength estimate versus beam angle are coupled to the Doppler data processor 33 via line 45 wherein they are utilized as a correction factor on the main beam Doppler spectrum to provide compensation for the total beam bias. Corrected main beam Doppler spectrums provided by the Doppler data processor and height tracker 33 are utilized to estimate vehicle velocity.

In addition to tracking the height of the vehicle, Doppler processor and height tracker 33 determines the round trip interval of a transmitted signal for the current beam position. At the expiration of this interval, height tracker 33 triggers beam control logic and timing unit 25 to steer array 23 to the next beam position, enables the transmitter 21 for signal transmission at the subsequent beam position, and activates time multiplexer 29 to permit proper separation and coupling of the receiver 27 main beam and auxiliary beam output signals to the signal processor 31.

A block diagram of a processor which may be utilized as the beam bias estimator 35 is shown in FIGS. 6A and 6B. Main beam and auxiliary beam echo amplitude data are coupled to an average echo amplitude estimator 47 via lines 37 and 39, respectively. Average echo amplitude estimator 47 averages the echo returns within the main and auxiliary beams over a predetermined time interval, to provide a main beam Doppler spectrum of averaged amplitudes and an auxiliary beam Doppler spectrum of averaged amplitudes. These averaged amplitude Doppler spectrums are coupled to an attenuation equalizer 49. Slant range within the main beam and auxiliary beam are respectively coupled, from units not shown, via lines 41 and 43 and propagating media characteristics, from units not shown, are coupled via line 44 to a beam attenuation estimator 51. Beam attenuation estimator 51 utilizes the slant range data and propagating media characteristics to establish signal attenuation estimates as function of beam angle which are coupled to the attenuation equalizer 49.

Attenuation equalizer 49 utilizes the data provided by the beam attenuation estimator 51 to compensate the averaged amplitude Doppler spectrums of the main and auxiliary beams for signal loss due to signal attenuation in the propagating medium, thereby providing amplitude averaged Doppler spectrums due substantially to backscatter from the reflecting terrain. The corrected Doppler spectrums for the main and auxiliary beams are coupled to an echo strength/backscatter processor 53, to which vehicle attitude data is also coupled, via line 55, from units not shown. Echo strength/backscatter processor 53 compares the main and auxiliary beam amplitudes, taking into account the vehicle attitude which causes the beams to rotate from their nominal positions relative to the terrain vertical, and provides the relative received signal strength, or terrain backscatter (echo strength), as a function of beam angle.

Echo strength versus beam angle data is coupled from the echo strength/backscatter processor 53 to a beam shape and bias estimator 57. Beam shape and bias estimator 57 partitions the beam shape into subportions, weights the subportions in accordance with the echo strength versus beam angle data and multiplies these values by the Doppler shift associated with each subportion. These products are integrated over the shape to provide the expected mean Doppler frequency. This Doppler frequency may be compared to the Doppler frequency expected along the beam axis to establish an estimate of the beam (or terrain) bias at an output line 59.

If an estimate of terrain bias is not desired the system of FIG. 6A may be simplified to that of FIG. 6B. As in the system of FIG. 6A, main beam and auxiliary beam echo amplitude data are coupled to an average echo amplitude estimator 47 via lines 37 and 39, respectively. As discussed previously, average echo amplitude estimator 47 averages the echo returns within the main and auxiliary beams over a predetermined time interval, to provide a main beam Doppler spectrum of averaged amplitudes and an auxiliary beam Doppler spectrum of averaged amplitudes. These averaged amplitude Doppler spectrums are coupled to an echo strength estimator 61, to which vehicle attitude data is coupled via line 55. The echo strength estimator 61 compares the main and auxiliary beam amplitudes, taking into account the vehicle attitude which causes the beams to rotate from their nominal positions relative to the terrain vertical, and determines the relative strength of the total received signal as a function of beam angle. The total signal strength versus beam angle factor is coupled to a beam shape and total bias estimator 63 which partitions the beam into subportions, weights the subportions in accordance the total signal strength versus beam angle factor, and multiplies the weighted beam angle subportions by the Doppler shift associated with each subportion. These products, as discussed previously, are integrated over the beam shape to determine an expected mean Doppler frequency, which may be compared to the Doppler frequency expected at the beam axis to provide an estimate of the total beam bias at output line 65.

While the invention has been described in its preferred embodiments, it is to be understood that the words that have been used are words of description rather than limitation and that changes may be made within the purview of the appended claims without departing from the true scope and spirit of the invention in its broader aspects.

I claim:

1. An apparatus for correcting a Doppler frequency spectrum derived from terrain reflected signals having at least one pair of beams through which signals are radiated and signals returned from a reflecting terrain are received, each of the at least one pair having a main beam with a main beam axis and an auxiliary beam with an auxiliary beam axis, the auxiliary beam axis positioned relative to the main beam axis at a predetermined angular offset and wherein signals representative of a main beam Doppler spectrum from signal returns within said main beam, and signals representative of an auxiliary beam Doppler spectrum from signal returns within said auxiliary beam are derived from received signals comprising:

averaging means coupled to receive said main beam Doppler spectrum representative signals and said auxiliary beam Doppler spectrum representative signals for averaging amplitudes of Doppler frequency signals within said main beam Doppler spectrum and said auxiliary beam Doppler spectrum over a predetermined time interval, and providing main beam averaged amplitude representative signals and auxiliary beam averaged amplitude representative signals;

signal strength means coupled to receive said main beam averaged amplitude representative signals and said auxiliary beam averaged amplitude representative signals for providing signals representative of received signal strength in said main beam relative to received signal strength in said auxiliary beam as a function of beam angle and providing signals representative of signal strength versus beam angle; and means coupled to receive said signal strength versus beam angle representative signal for providing a total beam bias correction.

2. An apparatus in accordance with claim 1 wherein said signal strength means includes attenuation estimator means comprising:

slant range means for providing signals representative of slant ranges from an origin of each of said at least one pair of beams to said reflecting terrain for angles within said main beam and said auxiliary beam, thereby providing slant range representative signals for said main beam and said auxiliary beam;

characteristics means for providing signals representative of propagating media characteristics;

attenuation means coupled to receive said slant range representative signals for said main beam, said slant range representative signals for said auxiliary beam, and said propagating media representative signals for determining propagating signal attenuation as a function of beam angle for said main beam and providing main beam attenuation versus beam angle representative signals and for determining propagating signal attenuation as a function of beam angle for said auxiliary beam and providing auxiliary beam attenuation versus beam angle representative signals; and compensating means coupled to receive said main beam propagating signal attenuation versus beam angle representative signals, said auxiliary beam propagating signal attenuation versus beam angle representative signals, said main beam averaged amplitudes representative signals, and auxiliary beam averaged amplitudes representative signals for compensating said main beam Doppler spectrum and said auxiliary beam Doppler spectrum for signal loss due to signal attenuation in said propagating medium, thereby providing main beam amplitude averaged Doppler spectrums and auxiliary beam amplitude Doppler spectrums due substantially to backscatter from said reflecting terrain.

3. A method for correcting Doppler frequency spectra of terrain reflected signals comprising the steps of:

providing at least one pair of beams through which signals are radiated and signals returned from a reflecting terrain are received, each of said at least one pair having a main beam with a main beam axis and an auxiliary beam with an auxiliary beam axis, said auxiliary beam axis positioned relative to said main beam axis at a predetermined angular offset; and providing signals representative of a main beam Doppler spectrum from said signal returns within said main beam and signals representative of an auxiliary beam Doppler spectrum from said signal returns within said auxiliary beam;

averaging amplitudes of Doppler frequency signals within said main beam Doppler spectrum and said auxiliary beam Doppler spectrum over a predetermined time interval, and providing main beam averaged amplitude representative signals and auxiliary beam averaged amplitude representative signals;

utilizing said main beam averaged amplitude representative signals and said auxiliary beam averaged amplitude representative signals to provide signals representative of received signal strength in said main beam relative to received signal strength in said auxiliary beam as a function of beam angle and providing signals representative of signal strength versus beam angle; and processing said signal strength versus beam angle representative signals to provide a total beam bias correction factor.

4. A method in accordance with claim 3 further including the steps of:

establishing slant ranges from an origin of each of said at least one pair of beams to said reflecting terrain for angles within said main beam and said auxiliary beam;

determining propagating media characteristics;

processing said slant ranges of said main beam, said slant ranges of said auxiliary beam, and said propagating media characteristics to determine propagating signal attenuation as a function of beam angle for said main and auxiliary beams;

utilizing said main beam propagating signal attenuation versus beam angle, said auxiliary beam propagating signal attenuation versus beam angle, said main beam averaged amplitudes, and auxiliary beam averaged amplitudes to compensate said main beam Doppler spectrum and said auxiliary beam Doppler spectrum for signal loss due to signal attenuation in said propagating medium.

* * * * *